Figure 1:
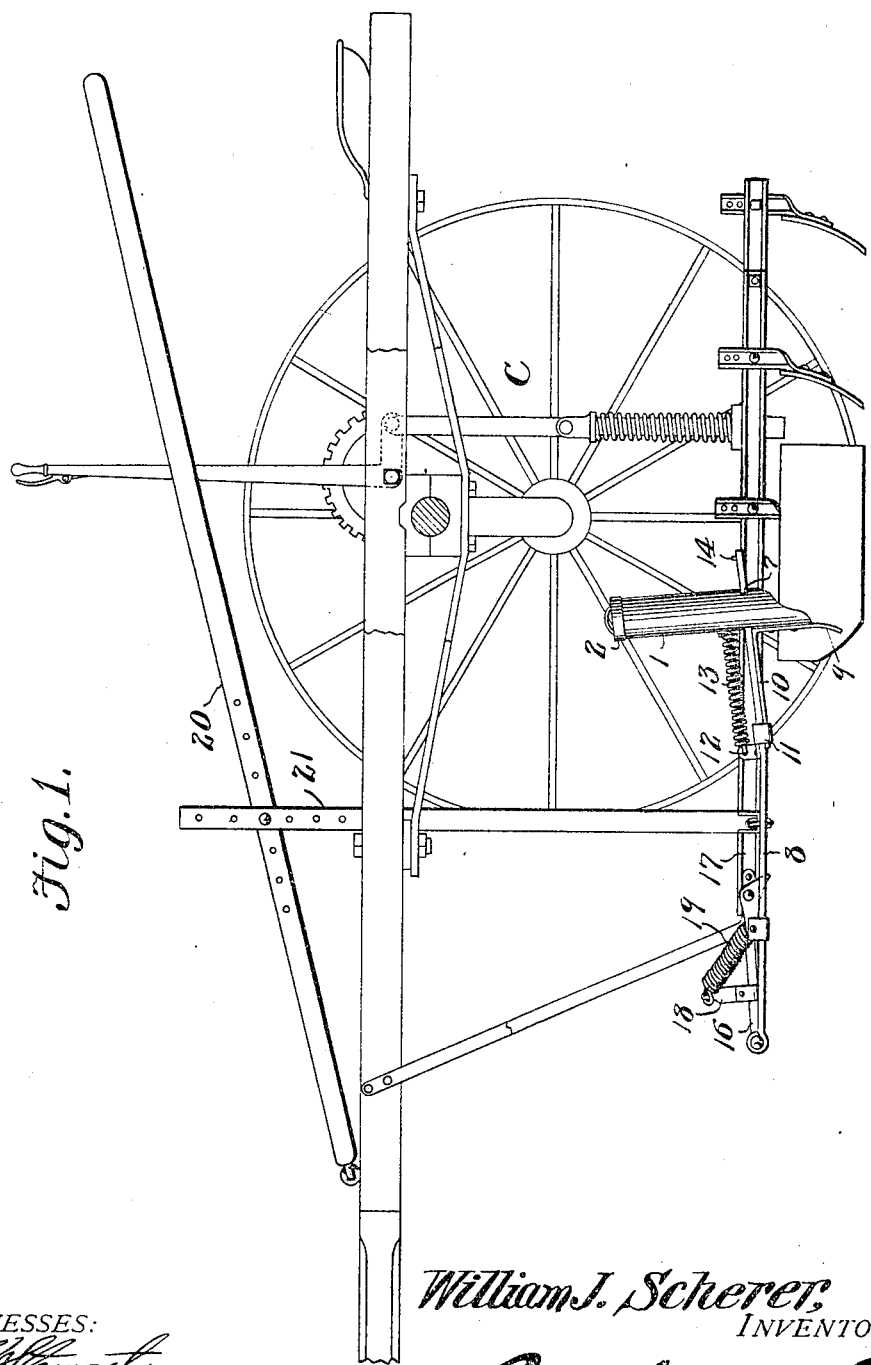

No. 812,239. PATENTED FEB. 13, 1906.
W. J. SCHERER.
REPLANTING ATTACHMENT FOR CULTIVATORS.
APPLICATION FILED DEC. 5, 1905.

2 SHEETS—SHEET 1.

WITNESSES:

William J. Scherer,
INVENTOR.

By
ATTORNEYS

No. 812,239. PATENTED FEB. 13, 1906.
W. J. SCHERER.
REPLANTING ATTACHMENT FOR CULTIVATORS.
APPLICATION FILED DEC. 5, 1905.
2 SHEETS—SHEET 2.
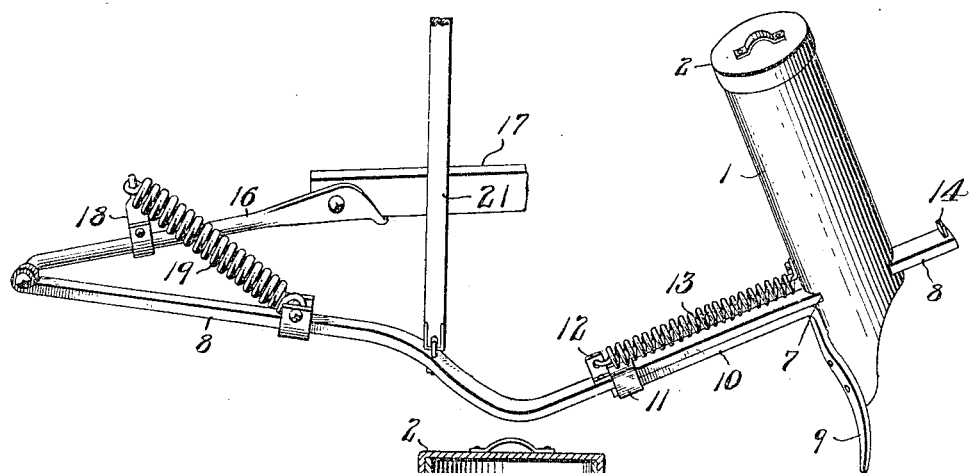
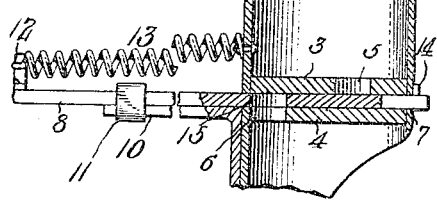
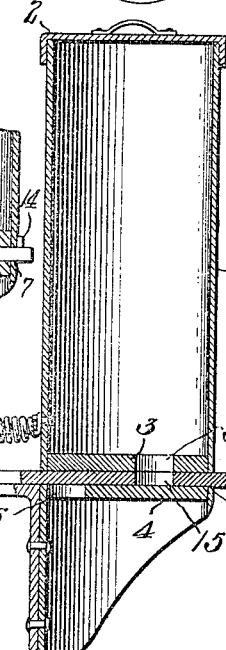
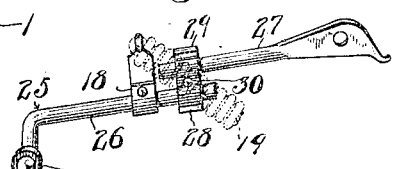
WITNESSES:
William J. Scherer, INVENTOR.
By ATTORNEYS

UNITED STATES PATENT OFFICE.

WILLIAM J. SCHERER, OF ARISPE, IOWA.

REPLANTING ATTACHMENT FOR CULTIVATORS.

No. 812,239. Specification of Letters Patent. Patented Feb. 13, 1906.

Application filed December 5, 1905. Serial No. 290,449.

*To all whom it may concern:*

Be it known that I, WILLIAM J. SCHERER, a citizen of the United States, residing at Arispe, in the county of Union and State of Iowa, have invented a new and useful Replanting Attachment for Cultivators, of which the following is a specification.

This invention relates to replanting attachments for cultivators.

When young corn or other plants is cultivated for the first time, it frequently happens that hills are encountered where the corn for some reason has failed to sprout and where replanting for this reason is desirable. Again, it is oftentimes desirable at the time of the first cultivation to deposit seeds of other plants, such as pumpkins, along the corn-rows, such seeds being deposited intermittently at intervals of three or four hills.

The object of the present invention is to provide a simple and inexpensive device capable of being conveniently applied to any ordinary cultivator and which may be utilized for the purpose of planting or depositing seeds in the manner and for the purposes described.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be made when desired.

In the drawings, Figure 1 is a vertical longitudinal sectional view of a cultivator, showing the invention applied in position for operation. Fig. 2 is a perspective view showing the improved clamping device detached from the cultivator. Fig. 3 is a vertical sectional view, enlarged, of the seed-planting device. Fig. 4 is a similar view showing the seed-planting device in discharging position, and Fig. 5 is a perspective view illustrating a modified form of the supporting-bracket.

Corresponding parts in the several figures are indicated throughout by similar characters of reference.

The improved seed-planting attachment has been illustrated as comprising a cylindrical receptacle or hopper 1, having a lid 2 and provided with an upper and a lower bottom member, said bottom members being designated, respectively, 3 and 4. These bottom members are spaced apart, and the upper bottom member 3 is provided with an aperture, forming a seed-cup 5, while the lower bottom member has an escape opening or aperture 6, which is located in advance of the seed-cup 5. The tubular receptacle 1 is provided between the bottom members 3 and 4 with a horizontal slot 7, through which extends a supporting-bar 8, upon which the tubular receptacle is slidably mounted. The receptacle extends downwardly below the lower bottom member 4, and to the front side thereof is secured a furrow-opening blade 9, having a horizontally-disposed arm or shaft 10, which is slidably disposed adjacent to the under side of the bar 8 and which is provided with a guiding-sleeve 11, encircling said bar. The latter is provided with a lug 12, which is connected by a spring 13 with the receptacle 1, which is thereby moved in a forward direction upon the bar, the forward movement being limited by the sleeve 11 striking against the lug 12. The receptacle 1 may be moved rearwardly upon the bar 8 against the tension of the spring 3, the extent of the rearward movement being limited by a stop-lug 14 upon the bar 8 near the rear end of the latter.

The bar 8 is provided with an aperture or seed-cup 15, which when the receptacle is at the forward limit of its movement is in registry with the seed-cup 5 in the upper bottom member 3 of the receptacle. When the latter is at the rearward limit of its movement, the aperture 15 will register with the escape-opening 6 in the bottom member 4.

The bar 8, which may be suitably curved in an approximately horizontal plane, is hingedly connected at its front end with a bracket 16, which latter is adapted to be bolted upon or otherwise suitably connected with the beam 17 of one of the gangs of an ordinary cultivator, which has been conventionally illustrated at C in Fig. 1 of the drawings. The bracket 16 has an upright 18, which is connected by a spring 19 with the bar 8, the free end of which is thereby normally maintained in a raised position. An operating-lever 20, suitably connected with the cultivator-frame, is connected, by means of an adjustable link 21, with the bar 8, which latter may thereby be depressed against the tension of the spring.

The curvature of the bar 8 is such that its rear end, carrying the seed hopper or receptacle, will be disposed about centrally between the gangs of the cultivator, as will be readily understood.

In operation the seeds that are to be planted are placed in the receptacle 1 and will pass through the aperture 5 in the upper bottom member into the seed cup or aperture 15 in the bar 8. When it is desired to deposit the charge of seed, the operator by pressure upon the lever 20 depresses the arm 8 against the tension of the spring 19 until the furrow-opening blade 9 engages the soil in the place where it is desired to drop the seed. As the cultivator moves forward the seed-receptacle, which is anchored to the ground by the furrow-opener, will move rearwardly upon the bar 8 against the tension of the spring 13 until the stop 14 is encountered, when the seed-cup 15 will be in registry with the discharge-aperture 6, through which the seed escapes into the opening prepared for its reception in the ground by the furrow-opener. As soon as downward pressure upon the lever 20 is released the spring 19 will elevate the bar 8 and its related parts, while the spring 13 will serve to restore the receptacle 1 to its normal position, where the seed-cup 15 may receive another charge of seed.

In Fig. 4 of the drawings there has been illustrated a modified form of the supporting-bracket whereby the device is connected with the cultivator-beam. Under this modification the bracket, which is here designated 25, is composed of two separate members 26 and 27, which are connected adjustably with each other by means of a clamping device, including a pair of clamping-plates 28 and 29, having opposite grooved faces to receive the members 26 and 27 and connected by means of a bolt 30. In this manner the range of adjustment of the device will be increased, and it will be adapted for use in connection with certain makes of cultivators for which without this adjustability a special supporting-bracket would be required.

As will be seen from the foregoing description, the construction of this improved device is extremely simple, and it may be manufactured at a moderate expense. It is capable of being attached for operation to any ordinary cultivator or corn-planter, such slight modifications as may be necessary in order to adapt the device to cultivators of special construction being considered within the scope of the invention.

Having thus described the invention, what is claimed is—

1. A supporting-bar having an aperture, a seed-receptacle slidably engaging said bar, and bottom members in said receptacle adjacent to the upper and under sides of the bar and having apertures adapted for alternate registry with the aperture in the bar.

2. A supporting-bar having an aperture, a slidably-supported seed-receptacle having apertured bottom members adjacent to the upper and under sides of the bar, spring means for moving the receptacle in a forward direction upon the bar, and an earth-engaging member connected with the receptacle.

3. A supporting-bar, a seed-receptacle slidable thereon, means for limiting the forward and rearward movement of the receptacle, and means for normally forcing the receptacle in a forward direction.

4. A supporting-bar, a seed-receptacle slidable thereon, means for limiting the forward and rearward movement of the receptacle, spring means for normally forcing the receptacle in a forward direction, and a furrow-opener connected with the receptacle for engagement with the earth to anchor said receptacle for rearward movement against the tension of the spring.

5. A hinged supporting-bar, a seed-receptacle slidable thereon, means for limiting the forward and rearward movement of the receptacle, a spring for normally forcing the receptacle in a forward direction, and a furrow-opener connected with the receptacle for engagement with the earth to anchor said receptacle for rearward movement against the tension of the spring.

6. A hinged supporting-bar, spring means for normally elevating the free end of the supporting-bar, a spring-actuated seed-receptacle slidably engaging the supporting-bar, and an earth-engaging blade connected with the receptacle.

7. A supporting-bar having stop-lugs, a seed-receptacle slidably engaging the bar between the lugs, a spring connecting the receptacle with one of the lugs, and an earth-engaging blade upon the receptacle.

8. A supporting-bar having stop-lugs, a seed-receptacle slidably engaging the bar between the lugs, a spring connecting the receptacle with one of the lugs, an earth-engaging blade connected with the receptacle and having a shank, and a sleeve upon said shank encircling the supporting-bar.

9. A supporting-bar, spring means for normally elevating the free end of said bar, a spring-actuated seed-receptacle slidable upon the bar and having an earth-engaging member, and lever means for depressing the supporting-bar against the tension of the lifting-spring.

10. A bracket having an upright, a supporting-bar hingedly connected with the bracket, a spring connecting the supporting-bar with the upright, a spring-actuated seed-receptacle slidably engaging the supporting-bar and having an earth-engaging member, and lever means for depressing the supporting-bar.

11. A bracket comprising two adjustably-connected members, one of said members being provided with an upright, a supporting-bar hingedly connected with one of the members of the bracket, a spring connecting the supporting-bar with the upright, a spring-actuated seed-receptacle slidably engaging the supporting-bar and having an earth-engaging member, and lever means for depressing the supporting-bar.

In testimony that I claim the foregoing as my own I have hereto affixed my signature in the presence of two witnesses.

WILLIAM J. SCHERER.

Witnesses:
 HORACE G. VINES,
 HARRY SPURRIER.